(12) United States Patent
Gilbert

(10) Patent No.: US 9,284,721 B2
(45) Date of Patent: Mar. 15, 2016

(54) FLUID FLOW CONTROL SYSTEM

(75) Inventor: Patrick Gilbert, Montecompatri (IT)

(73) Assignee: Patrick Gilbert, Montecomparti (IT)

( * ) Notice: Subject to any disclaimer, the term of this patent is extended or adjusted under 35 U.S.C. 154(b) by 415 days.

(21) Appl. No.: 13/704,293

(22) PCT Filed: Jun. 16, 2011

(86) PCT No.: PCT/EP2011/002973
§ 371 (c)(1),
(2), (4) Date: Mar. 6, 2013

(87) PCT Pub. No.: WO2011/157426
PCT Pub. Date: Dec. 22, 2011

(65) Prior Publication Data
US 2013/0199627 A1 Aug. 8, 2013

(30) Foreign Application Priority Data

Jun. 16, 2010 (GB) .................................. 1010097.2
Apr. 4, 2011 (GB) .................................. 1105684.3

(51) Int. Cl.
| | |
|---|---|
| *F16L 53/00* | (2006.01) |
| *G05D 23/185* | (2006.01) |
| *G05D 23/13* | (2006.01) |
| *A47K 3/28* | (2006.01) |
| *E03B 1/00* | (2006.01) |
| *E03C 1/04* | (2006.01) |
| *E03C 1/044* | (2006.01) |
| *F24D 17/00* | (2006.01) |
| *F24D 19/10* | (2006.01) |
| *G05D 16/10* | (2006.01) |
| *E03C 1/00* | (2006.01) |

(52) U.S. Cl.
CPC . *E03B 1/00* (2013.01); *E03C 1/044* (2013.01); *E03C 1/0408* (2013.01); *F24D 17/001* (2013.01); *F24D 19/1051* (2013.01); *G05D 16/103* (2013.01); *E03C 2001/005* (2013.01); *F24D 2200/20* (2013.01); *Y10T 137/6416* (2015.04); *Y10T 137/7793* (2015.04)

(58) Field of Classification Search
CPC .......... E03C 2001/005; F24D 17/0005; G05D 23/13; G05D 23/1306
USPC ................. 137/334, 339, 341, 629; 236/12.1, 236/12.11; 4/598, 605
See application file for complete search history.

(56) References Cited

U.S. PATENT DOCUMENTS

| | | | | |
|---|---|---|---|---|
| 1,522,907 | A * | 1/1925 | Price | 137/100 |
| 1,680,750 | A * | 8/1928 | Smoot | 137/100 |
| 2,990,840 | A * | 7/1961 | Snow | 137/98 |
| 3,091,393 | A * | 5/1963 | Sparrow | 137/805 |

(Continued)

*Primary Examiner* — Marina Tietjen
*Assistant Examiner* — Seth W Mackay-Smith
(74) *Attorney, Agent, or Firm* — Price Heneveld LLP

(57) ABSTRACT

A fluid flow control system has a heating device for heating a fluid and a first flow path for providing the heated fluid from the heating device to a use region. A heat exchanger has a supply path that received fluid from a fluid supply, and an outlet path that receives fluid from the use region, whereby the fluid in the supply path is pre-heated by the fluid in the outlet path. A second flow path provides pre-heated fluid from the supply path of the heat exchanger to the heating device. Modulating devices control fluid flow through the outlet path along the supply path. A flow control device controls the modulating devices such that the fluid flow rates in the fluid supply path and outlet path of the heat exchanger are balanced, so as to be substantially the same.

19 Claims, 3 Drawing Sheets

(56) References Cited

U.S. PATENT DOCUMENTS

| | | | | |
|---|---|---|---|---|
| 3,116,748 | A | * | 1/1964 | Wasson ............................ 137/98 |
| 3,232,336 | A | * | 2/1966 | Leslie et al. ............... 236/12.11 |
| 4,039,125 | A | * | 8/1977 | Botnick ..................... 236/12.11 |
| 4,398,308 | A | * | 8/1983 | Berg .................................. 4/598 |
| 4,454,911 | A | * | 6/1984 | Arbabian ................. 165/104.19 |
| 4,554,688 | A | * | 11/1985 | Puccerella ........................ 4/668 |
| 4,653,524 | A | * | 3/1987 | Wilson ......................... 137/110 |
| 4,965,894 | A | * | 10/1990 | Baus ................................. 4/605 |
| 5,293,654 | A | * | 3/1994 | Castwall et al. ................. 4/598 |
| 5,459,890 | A | * | 10/1995 | Jarocki ............................. 4/668 |
| 2008/0196156 | A1 | * | 8/2008 | Brewin ............................. 4/597 |
| 2009/0300839 | A1 | * | 12/2009 | Gay ................................. 4/613 |
| 2010/0139579 | A1 | * | 6/2010 | Su et al. ..................... 122/367.1 |

* cited by examiner

FLUID FLOW CONTROL SYSTEM

FIELD OF THE INVENTION

The present invention relates to a fluid flow control system. It also relates to valve mechanisms, plumbing components or accessories and their arrangement or combination in devices for balancing and stabilising the flow rates of fluid flows in two or more conduits, primarily for the application of enhancing the efficient recovery of heat through countercurrent heat exchange devices such as may be used in sanitary shower installations or other energy saving heated water utilities connected to multiple utility supplying water heating systems.

Embodiments of this invention not only improve the effectiveness of heat recovery devices that save useful energy for example in the domestic/building environment but facilitate their general adoption by making their usage more practical and convenient, for the benefit of the environment and the conservation of its energy resources.

BACKGROUND OF THE INVENTION

Heat exchangers used for recovery of heat from the waste water of sanitary showers in the prior art require dedicated/independent water heating units to ensure balanced flow rates of the heat mediating fluids for optimal performance. Heat recovering shower installations that share the hot water supply with other hot water facilities typically transfer the recovered heat only to the shower's cold water supply which significantly reduces or limits the operational effectiveness of the heat exchanger. Shower installations using heated water from heated water utilities that are not exclusive or dedicated (i.e. that can supply heated water simultaneously to additional separate hot water taps or outlets) with heat exchange devices (HXDs) according to the prior art are affected by unbalanced fluctuations in or disturbances to the balanced flow of heat mediating fluids through the heat exchange devices and consequently they experience reductions in the amount of useful heat that is recovered. The economical and environmental benefit of using heat exchange devices is especially significant for communal facilities having multiple shower installations that are extensively used, such as for sports clubs or public swimming pools, and these generally use centralised (multiple facility supplying) water heating units, which are more cost effective. There is a need to improve the performance of such systems having heat exchange devices so as to reduce the effects of such fluctuations and disturbances in the fluid flow and thereby improve the performance of the heat exchanger devices.

SUMMARY OF THE INVENTION

In accordance with a first aspect of the present invention there is provided a fluid flow control system comprising:
a heating device for heating a fluid;
a first flow path for providing the heated fluid from the heating device to a use region;
a heat exchanger having a supply path adapted to receive fluid from a fluid supply and a outlet path adapted to receive fluid from the use region, whereby the fluid in the supply path is pre-heated by the fluid in the outlet path;
a second flow path for providing the pre-heated fluid from the supply path of the heat exchanger to the heating device;
a first flow modulating device for controlling a flow of fluid through (along) the outlet path; and,
a second flow modulating device for controlling a flow of pre-heated fluid along the supply path;
wherein the system further comprises a flow control device adapted to control each of the first and second flow modulating devices such that, during use, the fluid flow rates in the fluid supply path and outlet path of the heat exchanger (or changes to said flow rates) correlate substantially in proportion (or are substantially the same).

The invention therefore controls the flow within the supply and outlet paths of the heat exchanger by coordinating the operation of the first and second flow modulating devices. It will be noted that this stabilises the flow and allows the supply of at least some of the pre-heated fluid along the second flow path to the heating device. It is preferred that the fluid flow rates are substantially the same over a range of different flow rates corresponding substantially to the range of flow modulation provided by the modulating devices. Thus a consistently "balanced" flow rate may be maintained during use of the system.

The system may additionally be provided with a bypass flow path for providing the pre-heated fluid from the supply path to the use region, the bypass flow path being connected between the second flow path upstream of the heating device and the first flow path downstream of the heating device. A bypass flow modulating device is provided in this case, for controlling the flow of fluid in the bypass path. The bypass path enhances the control of the temperature and flow rate of the fluid delivered to the use region. The bypass path or bypass flow modulating device may also include a component/feature to generally resist the free flow of fluid therethrough or generally increase the fluid's loss of pressure head whilst flowing therethrough. It is preferred that the flow control device is further adapted to control the bypass flow modulating device such that the flow rate in the bypass path is a function of the flow rate in the first and/or second flow paths.

Each of the first, second and bypass flow modulating devices are typically capable of providing a variable degree of fluid flow between a closed position in which fluid flow is prevented and a fully open position. Such variability may be stepwise through a series of steps, or continuous and may be either linear or non-linear.

The control device may be arranged to be operative to cause the actuation of the first and second flow modulating devices proportionally to that of the bypass flow modulating device. Alternatively, the control device may be operative to cause the actuation of the first and second flow modulating devices inversely proportionally to that of the bypass flow modulating device so as to allow control of the temperature of the fluid in the use region substantially independently of the fluid flow rate. The flow control device may comprise a common actuating device for controlling the said modulating devices, preferably simultaneously. The modulating devices may be controlled according to one or more of a number of mechanisms. For example, they may be mechanically connected, such as by using couplings or linkages. They may be hydraulically actuable using hydraulic lines or electrically actuable using electrical signals. In principle the flow modulation devices may take a number of different forms, offering variable resistance to flow. Typically the flow modulation devices take the form of a valve or other variable flow restriction.

The heating device may also take a number of different forms including a fluid reservoir having an associated heater. Typically, the heating device is adapted to supply heated fluid independently (simultaneously) to a further one or more other use regions. In such a case multiple instances of the system, sharing a common heating device, may be provided.

The flow modulating devices may be included at a number of possible locations. Normally, the first flow modulating device is positioned within (at a location along) the first flow path. Likewise, the second flow modulating device may be positioned within either the second flow path or the supply path upstream of the heat exchanger.

In order to provide additional operational advantage, the fluid flow control system may further comprise a fluid pressure regulating system, the fluid pressure regulating system comprising:— a fluid pressure modulating device;

pressure sensitive (displaceable) areas of surface in pressure communication with the upstream and downstream sides of the first and second flow modulating devices which are coupled so as to actuate a common mechanism for controlling the fluid pressure modulating device;

a pressure control system adapted in use to control the fluid pressure modulating device, in accordance with the displacement of the pressure sensitive surfaces, so as to control the flow of fluid in the second flow path with respect to that in the first flow path.

The fluid flow control system may comprise an electronic embodiment of the fluid pressure regulating system having pressure sensors, electrical coupling, an electronic pressure control system and a motorised or electrically actuated fluid pressure modulating device. Is such embodiments the surface area and/or operational displacement of the pressure sensitive surfaces may however be practically imperceptible, being very small or microscopic.

The fluid flow control system may further comprise a (mechanically embodied) fluid pressure regulating system, the fluid pressure regulating system comprising:— a fluid pressure modulating device;

a first upstream subchamber and a first downstream subchambers having a common first displaceable separator, the displacement of the first displaceable separator determining the relative internal volumes of (determined by the relative fluid pressures within) each of the first upstream and downstream subchambers, wherein an upstream side of the first flow modulating device is arranged in pressure communication with the first upstream subchamber and a downstream side of the first flow modulating device is arranged in pressure communication with the first downstream subchamber;

a second upstream subchamber and a second downstream subchamber having a common second displaceable separator, the displacement of the second displaceable separator determining the relative internal volumes of (determined by the relative fluid pressures within) each of the second upstream and downstream subchambers, wherein an upstream side of the second flow modulating device is arranged in pressure communication with the second upstream subchamber and a downstream side of the second flow modulating device is arranged in pressure communication with the second downstream subchamber, the upstream side of the second flow modulating device being arranged for receiving fluid from the fluid pressure modulating device, and wherein the first and second separators are coupled mechanically; and, a pressure control system adapted in use to control the fluid pressure modulating device, in accordance with the position of the first and second separators with respect to the subchambers, so as to control the flow of fluid in the second flow path with respect to that in the first flow path.

The pressure differential between the first upstream, first downstream, second upstream and second downstream subchambers generates opposing forces which produce a resultant force, particularly during pressure instability, which causes the movement of the coupled separators. The pressure communication may be provided by the displacement of a diaphragm so as to transfer pressure to a fluid within the subchamber in question. However, typically the pressure communication is provided by fluid communication in which fluid is able to flow into and out of the subchamber. Although the subchambers may be positioned separately, a compact arrangement can be provided by the first upstream and first downstream subchambers being provided as separate parts of a first chamber, and the second upstream and second downstream subchambers being provided as separate parts of a second chamber. Where the upstream and downstream subchambers are not so aligned the displaceable separator may have a form more recognisable as a plurality of fluid confining surfaces which are coupled by a mechanism for concerted displacement, such as a rocker arm for example. In the preferred arrangement the second downstream subchamber forms part of the second flow path and the first upstream subchamber forms part of the first flow path. Preferably, each of the subchambers is substantially the same or is exposed to a similar displaceable separator surface area.

The fluid pressure regulating system may monitor the fluid pressure in the conduit leading to or from the heat exchanger and be arranged such that a decrease in the monitored pressure below a particular (predetermined or dynamically determined) level causes the corresponding opening of the said pressure modulating device. Likewise, an increase in the pressure head above a particular (predetermined or dynamically determined) level (which may be a different level) may cause the corresponding closure of the said pressure modulating device. Thus the pressure modulating device may achieve an equilibrated position in between these dynamic states, so that the monitored pressure head may be stabilised at a predetermined or particular level.

The fluid pressure modulating device may take a number of different forms in a similar manner to the fluid flow modulating devices mentioned earlier, for example including various types of valve providing a variable flow resistance. The fluid pressure modulating device is preferably positioned in the supply path. This allows control of the "input" flow pressure.

The subchambers may be prismatic or cylindrical in geometry. The separators may be provided as displaceable (including deformable) members, including diaphragms. In the case of prismatic or cylindrical subchambers, the displaceable separators are preferably piston heads slideable in a fluid-tight manner within their respective subchambers. The direction of the to-and-fro motion of such separators may therefore align with the primary axis of symmetry of the subchambers.

One or more openings allowing fluid communication with one or more of the subchambers may be provided so as to be blocked when the corresponding piston head is in a predetermined position. This may be the case when the subchambers are used as part of the flow path for example, such as at an extreme position of the separator within its possible movement range. The pressure control system may comprise a spool valve coupled to the separators and arranged to operate the fluid pressure modulating device hydraulically. The hydraulic fluid may be provided from the flow path which the pressure modulating device controls (either connected upstream or downstream).

The separators may be allowed to move freely within a range of possible movement. However, one or more resilient members may be positioned so as to bias the displaceable separators to a position which is intermediate between each end of a possible range of displacement. Such members may include elastomeric materials or springs. It is envisaged that there may be a possibility of normal modes of oscillation being possible in some applications, depending upon the geometry and operational components and conditions. In order to reduce such oscillations, the system may further comprise a displacement damper coupled to one or more of the separators so as to prevent or dampen oscillations in the displacement of the separators. The damping may be effected by causing the movement of a component with respect to a fluid. A fluid filled cavity may be provided in a subchamber wall within which a shaft or member attached to a piston or mechanical linkage may move so as to dampen the movement of the piston-linkage mechanism.

Although not essential, practically it is convenient to arrange the displacement of the separators so as to be along a common direction. The subchambers may be aligned for concerted movement of the separators and/or connecting shafts so as to be co-linear or co-axial. When the separators are provided as pistons, one or more conduits may be provided within the pistons so as to allow a flow of fluid therethrough. These may be provided in the piston heads or in other parts of the piston (such as the shaft) in order to provide for a compact arrangement.

When in use the position of the first and second separators is typically arranged to be a function of the relative pressures within the first upstream, first downstream, second upstream and second downstream subchambers. This may be aided by the provision of resilient members which urge the separators to an intermediate displacement position (this "displacement" of course including any geometry when a diaphragm is used). It will be appreciated that the mechanical coupling between the separators typically causes the separators to experience a concerted displacement. In principle however, such displacement may be in opposed directions or in non-parallel directions depending upon the coupling arrangement.

In a preferred arrangement the flow modulating devices are electrically actuated (for example using motors and motor drives) and the system further comprises one or more temperature sensors and a user interface for controlling the flow modulating devices using the information from the said temperature sensors. It will be appreciated that other forms of actuation (hydraulic or mechanical) may also be used in accordance with the temperature sensor(s) or temperature sensitive elements and user interface. This provides general thermostatic flow regulation of the fluid at the use region.

In the specific examples described herein, as a typical application for the system, the use region is formed as a shower. However, it will be understood that other domestic and industrial applications may benefit from the invention where heated water or other fluid is needed in a use region and where thermal energy is recovered from the fluid leaving the region.

The system may be effected by the provision of a number of the elements within a unit such as a self-contained device. This is convenient for installation purposes and also for retrofitting the invention to existing systems. Preferably therefore, a control unit may be provided for a fluid flow control system according to the first aspect of the invention, the control unit comprising each of:— the first flow modulating device;
the second flow modulating device;
the flow control device; and further comprising,
fluid connections for fluid coupling of the control unit to the heating device and the heat exchanger.

Optionally a number of other elements may be independently included within the unit, including parts of the flow paths, the bypass flow modulating device and associated flow path, and the pressure regulating mechanism.

We have realised further that the fluid pressure regulating system described earlier may also have applications where the system according to the first aspect of the invention may not necessarily be present. Thus, in accordance with a second aspect of the present invention there is provided a fluid pressure regulating system comprising:— a fluid pressure modulating device connectable to a fluid supply;

a first flow modulating device and a second flow modulating device, each having a controllable resistance to fluid flow;

a first upstream subchamber and a first downstream subchamber having a common first displaceable separator, the displacement of the first displaceable separator determining the relative internal volumes of (determined by the relative fluid pressures within) each of the first upstream and first downstream subchambers, wherein an upstream side of the first flow modulating device is arranged in pressure communication with the first upstream subchamber and a downstream side of the first flow modulating device is arranged in pressure communication with the first downstream subchamber;

a second upstream subchamber and a second downstream subchamber having a common second displaceable separator, the displacement of the second displaceable separator determining the relative internal volumes of (determined by the relative fluid pressures within) each of the second upstream and downstream subchambers, wherein an upstream side of the second flow modulating device is arranged in pressure communication with the second upstream subchamber and a downstream side of the second flow modulating device is arranged in pressure communication with the second downstream subchamber, the upstream side of the second flow modulating device being arranged for receiving fluid from the fluid pressure modulating device, and wherein the first and second separators are coupled mechanically; and, a pressure control system adapted in use to control the fluid pressure modulating device, in accordance with the position of the first and second separators with respect to the subchambers.

The system according to the second aspect of the present invention may be further provided independently with each of the features described above in association with the fluid pressure regulating system of the first aspect of the invention. Thus the system according to the second aspect may be used for the control of fluids in other applications than that of flow-balanced heat exchangers. It will be appreciated that, as for the first aspect of the invention, the first and second flow modulating devices or the pressure modulating device may be mechanically, hydraulically or electrically actuated in response to the displacement of the separators. Other elements described herein in association with the first aspect are intended to be readily useable and combinable with the second aspect.

Preferred embodiments of the invention will comprise a unit incorporating at least the first and second flow modulating devices having at least two inlets and at least two outlets for the passage of fluid flow there through and for connection with associated conduits. Preferred embodiments may have three inlets and three outlets.

These and other features, advantages, and objects of the present invention will be further understood and appreciated by those skilled in the art by reference to the following specification, claims, and appended drawings.

DETAILED DESCRIPTION OF THE PREFERRED EMBODIMENTS

Figure 1:
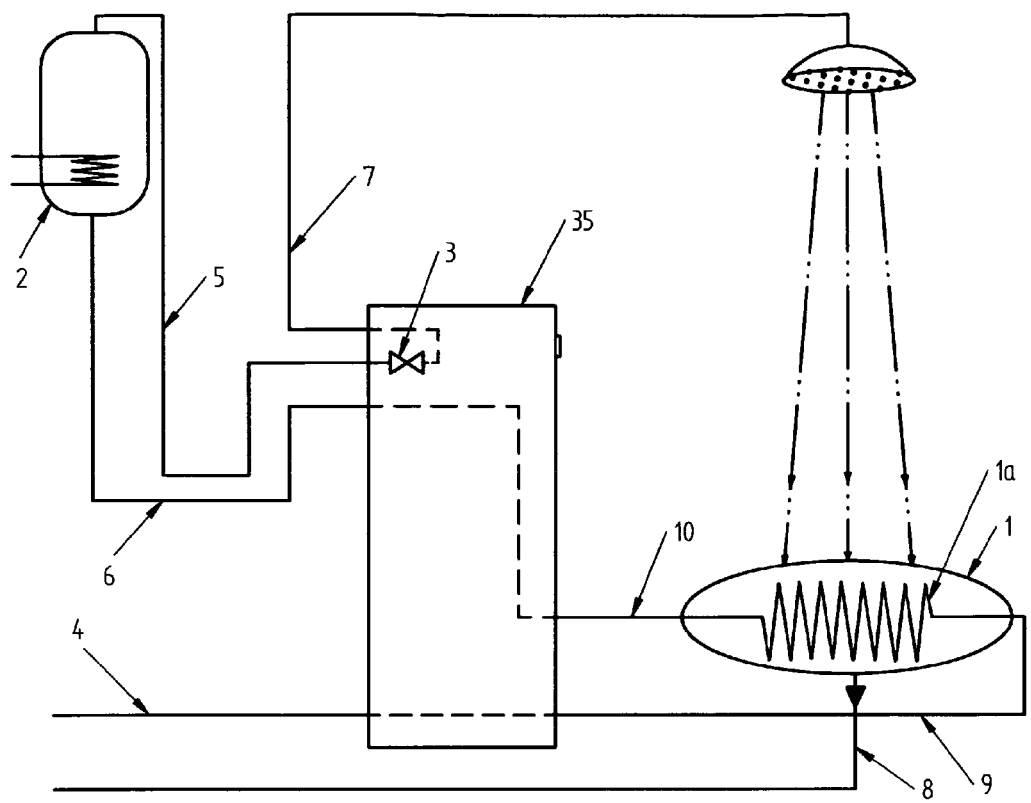
FIG. 1 is a schematic representation of a known system having a heating device and counterflow heat exchanger.
Figure 2:
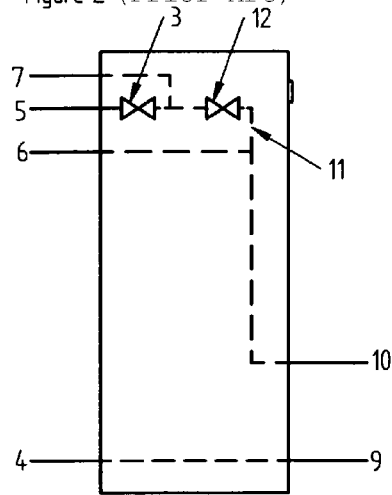
FIG. 2 illustrates the provision of a bypass flow path according to the known example.
Figure 3:
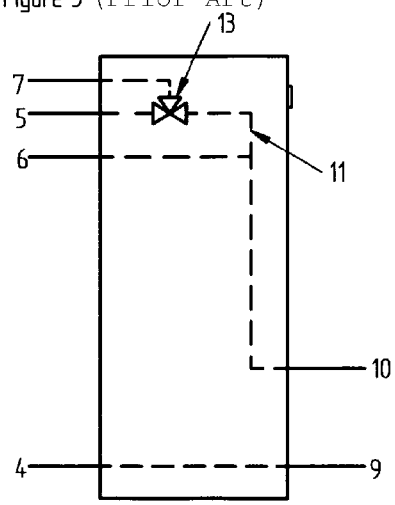
FIG. 3 shows the use of a bypass flow path and three way valve according to the known example.

We firstly briefly describe a number of prior art shower installations in association with FIGS. 1 to 3. FIGS. 1 to 3 illustrate shower installations utilising a counterflow heat exchanger and a dedicated water heating unit according to the prior art, which typically have (with associated reference numerals):

A counterflow heat exchanger, with a thermally conductive serpentine conduit (1a);

A thermal accumulator with/or a water heating apparatus;

A valve or component for regulating the flow of heated water through the shower head. This may be associated with a valve or component to control the flow of unheated (or preheated) water through the shower head (12; FIG. 2) or combined with one as a 3-way mixer valve (13; FIG. 3), and are externally connected via four water flow conduits:

To recieve a supply of fresh cold water (from external water mains);

To recieve a supply of heated water (from a central hot water or water heating unit);

To deliver a supply of prewarmed water to the water heating unit (to replenish the hot water consumed from (5) above with prewarmed water from the heat exchanger);

To deliver a supply of cold, heated or blended-warm water through the shower head.

Additionally there will be four locally flowing water conduits:

To conduct waste water from the heat exchanger (to the external sewage system);

To deliver fresh cold water to the heat exchanger's heat transfer conduit;

To recieve preheated water from the heat exchanger's second flow conduit;

To conduct prewarmed water (from 10) to the shower head delivery pipe (7) or first flow conduit (shown in FIGS. 2,3).

In order to illustrate the invention initially, in terms of a practical example in the form of a shower system, unlike in the prior art, the invention aims to maintain balanced flow rates through the shower's heat exchange device which is typically connected to a multiple facility-supplying water heating unit, so as to maintain optimal heat recovery efficiency under variable circumstances of usage. A further benefit of the invention is the stabilising of the outflow fluid temperature to the shower head during disturbances or fluctuations in the hot or cold water supply pressures, as typically occurs in multi-user systems. The initially changing temperature of the preheated water supply requires continual flow adjustment for thermostasis and the significant resistance to fluid flow of some heat exchanger conduits are both factors which compound disturbances to the shower's thermostatic outflow. The present invention is better suited/adapted than known means to cost-effectively counteract these problems.

Whilst the invention may have various special fields of useful application, the principle and most common context foreseen for its use is in plumbing installations for sanitary showers or other heated water utilities with heat exchangers to balance the fluid flow rates in the conduits arranged for counterflow, which will be described here. Whilst the invention finds utility with generally any suitable fluid (including, in principle, a gas), it will be understood that in most cases such fluid will be a liquid such as water or aqueous solution, and for this reason the description refers to water for illustration purposes. Likewise, heated or temperature regulated fluid utilities will be referred to generally by references to sanitary showers herein.

Figure 4:
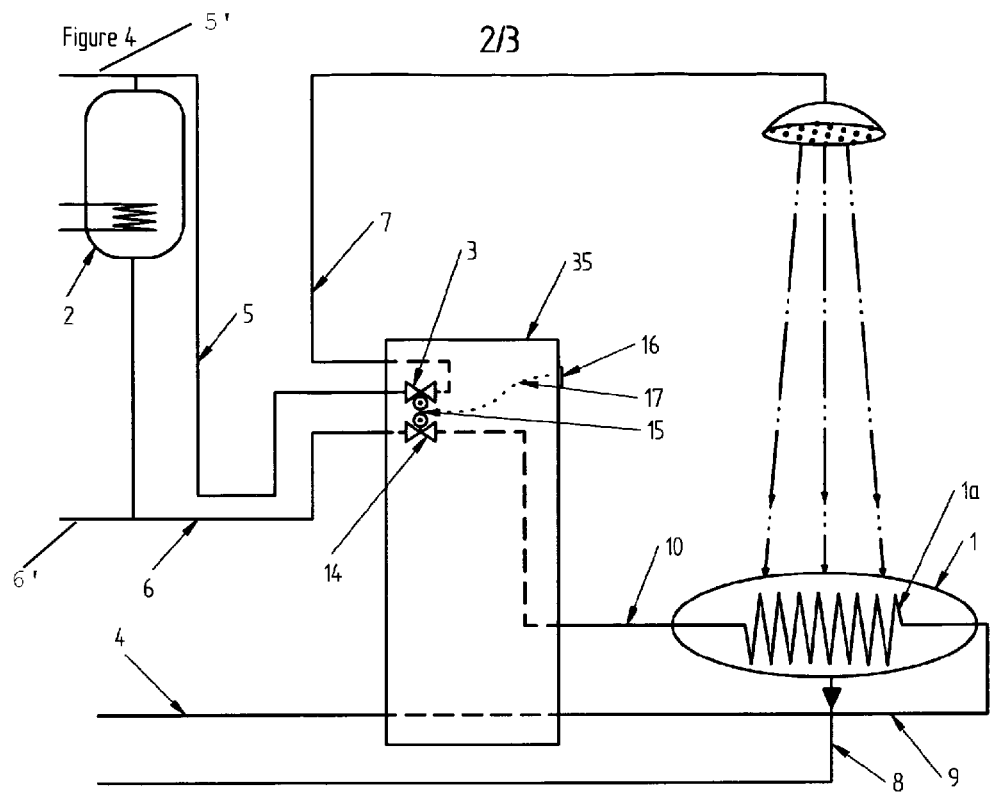
FIG. 4 is a first example according to the invention using linked valves.
Figure 5:
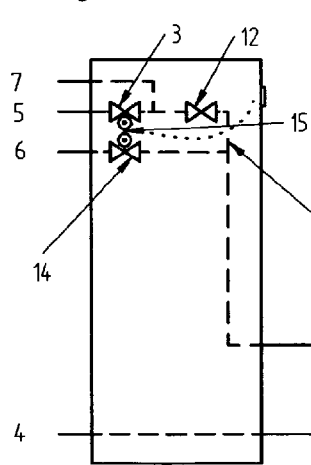
FIG. 5 shows a second example with the addition of a bypass flow path and valve.

Referring to FIG. 4 in comparison to FIG. 1, the invention can be thought of as an arrangement of two of more fluid flow or fluid pressure regulating valves (3,14) wherein they are functionally linked. The said valves regulate the flow of fluid by applying variable hydrodynamic resistance to the flow of fluid at two segments of (or points along) a flow path that passes from a pressurised or pressure regulated fluid source, e.g. "the mains" water supply (4), through the thermally conductive conduit 1a of the heat exchanger (1) where it may be preheated, then subsequently but not necessarily through a fluid heater (2) and finally through a conduit to supply a shower head or heated fluid outlet (7) from which fluid is drained through the heat exchanger (1). A number of the components (such as the valves 3,14 in FIG. 4) and connecting conduits are provided within an installable unit 35 having associated input and output fluid connections. Further, conduits connecting to any number of alternative inlets/outlets to the water heating unit (5', 6') or the instances of implemented fluid flow control systems such as are described and illustrated herein.

The first valve is located in the section of conduit conducting fluid flow from the fluid heater (5) to the heated fluid outlet (7). The second valve (14; 18 in later examples) may be either located to regulate fluid flow in the path (6) from the heat exchanger to the fluid heater or in the fluid flow path (9) upstream of the heat exchanger.

As described above, in the examples of the invention a unit or device (35) may be provided with which a separate heat exchanger and/or fluid heatind device may be connected via conduits to inlets or outlets of the unit/device (35). The first valve (3) is positioned to regulate the flow of a first fluid flow (path) between a first device inlet and a first outlet, the second valve (14) being positioned to regulate the flow of a second fluid flow (path) between a second device inlet and a second device outlet. The inlets and outlets are inlets and outlets of the device (35).

The invention which is here presented by way of example in the form of a device (35) provides a means of balancing the flow rate in two conduits of a plumbing installation or warm water utility connected to a water heating apparatus and a counterflow heat exchanger whereby the flow of fluid proceeding from the heat exchanger to the water heating apparatus is regulated with respect to the flow of fluid from the said water heating apparatus to the said utility by evenly distributing the user-controlled variable resistance to fluid flow separately along each conduit in proportion to the regulated pressure difference across each of the said two conduits, by means of a device having two flow control valves which are mechanically or functionally linked by an articulation and/or a common/unified control interface for the simultaneous variable/incremental and proportional actuation of the said valves.

The flow control valves in this context may be any type of valve that can regulate or vary the flow or pressure change/loss of fluid across/through it. These valves may be parts or aspects of more complex devices e.g. 3-way valves (13 and 18 in FIG. 6) or 4-way valves. The two valves may be so arranged or implemented as to be effectively a kind of 4-way valve.

Figure 6:
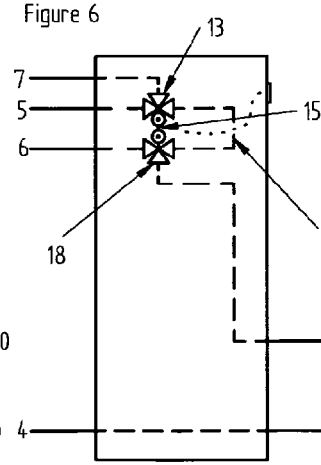
FIG. 6 shows a third example where the three valves of the second example are combined into two three-way valved.
Figure 7:
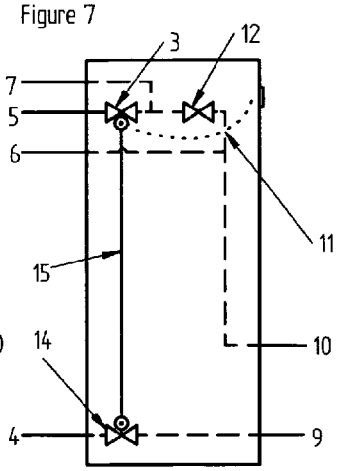
FIG. 7 shows a fourth example where one of the linked valves is positioned within a flow path upstream of the heat exchanger.

FIGS. 4 to 7 show schematic arrangements of warm water (shower) utilities with heat exchangers connected to multiple utility supplying water heaters, as the context of the here disclosed invention. FIG. 6 illustrates the use of two 3-way valves as an alternative to three 2-way valves. FIG. 7 illustrates that the second valve may be located alternatively on a separate or third conduit, whether the valve is a 2-way valve (as illustrated) or another type of valve such as a 3-way valve as illustrated in FIG. 6.

The device (35) is arranged for the flow of two (or more) fluid flows flowing separately therethrough, whereby each fluid flow enters the device through an inlet thereof and exits the device through an outlet thereof passing through a flow restricting/resisting variable aperture therebetween, the device having a mechanism with a user interface for adjusting both of said apertures simultaneously and proportionally. Preferably in this example this mechanism is a mechanical linkage (15), or rigid member connected to the actuator(s) of both valves, but may otherwise be any means (e.g. electrical) for conducting a signal or impulse that actuates the said valves and which are connected to (originating from) a common controlling/actuating component.

The separate fluid flows may be interconnected for parallel or series flow arrangement, whereby: a) they may share sections of conduit concurrently, or b) the inlet of one flow path may be connected to the outlet of another so as to be conceptually rather than materially identifiable inlets/outlets.

The devices here described as embodiments of the disclosed invention may and preferably will incorporate other components, features, aspects or means of embodiment not conceptually relevant to the claimed invention which may pertain to the prior art and are therefore not described in detail here, such as mechanisms or processes for automated thermostatic control of the shower utility using electronic components, motors/actuators, sensors and user interface controls.

With respect to using components of the prior art that directly monitor and regulate fluid flow within conduits directly, this invention is a more cost-effective flow control solution effected by the simultaneous regulation of both pressure head differentials and hydrodynamic resistances across each of two valves which are connected, one at the inlet (5) and the other at the outlet thereof (6), in series with one or other of the two counter-balanced fluid flow conduits to be regulated, taking into consideration also the hydrodynamic properties of the two fluid flow conduits.

The device (35) exploits the general principle that relates the flow-rate in any section of conduit proportionally to the pressure difference across it and inversely proportionally to the resistance to flow along it.

The ultimate objective is to generally balance the flow rates of the two fluids passing though a heat exchanger under variable conditions, which it effects indirectly through stabilising the balanced rates of flow in both the inflowing hot water supply conduit and the outflowing water replenishment conduits connecting the plumbing installation or warm water utility to a heated water system susceptible to independent net flow and/or pressure disturbances.

The effective performance of the disclosed valve arrangement as a flow balancing device assumes (or relies/depends on) the maintenance or regulation of corresponding relative pressure heads and/or pressure differentials in or across various sections of fluid conduit along the fluids flow path(s) from the water supply to the shower head or outlet. However, disturbances to these operational conditions commonly arise in many circumstances of operation which are antithetical to the appropriate performance of the disclosed valve arrangement as an effective flow balancing device for which a special mechanism is needed to compensate. In such situations, embodiments of the disclosed invention may be effectively employed incorporating a pressure regulating mechanism (PRM) which governs the operation of a third valve to control the flow and pressure head of fluid in the heat exchanger conduit (1*a*) relative to the pressure head in the water heater conduit (6-5), relative also to the shower head/outlet pressure head (7).

The achievement of the disclosed invention is to so regulate the pressure head (or hydrodynamic flow resistance) in the conduits simultaneously feeding/receiving fluid flow to/from the heated water system/conduit as to have a minimal or reduced impact on the pressure head of heated water supplying the various outlets during the various operational states of normal usage, so as to stabilise the outflow through the shower head and other outlets.

Figure 8:
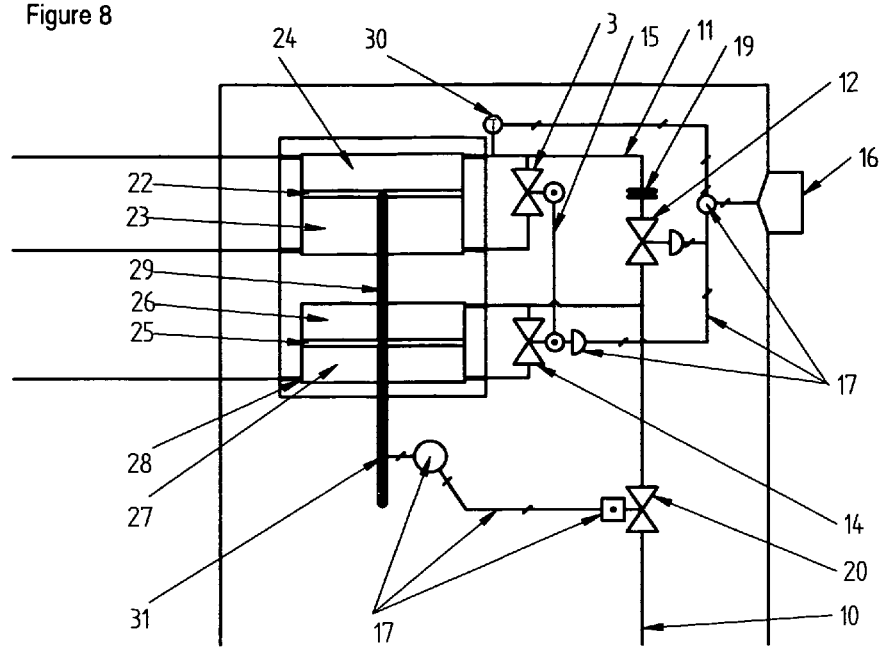
FIG. 8 shows a fifth example incorporating a pressure regulating system; and, FIG. 9 illustrates a sixth example incorporating a hydraulically operated fluid pressure modulating device.
Figure 9:
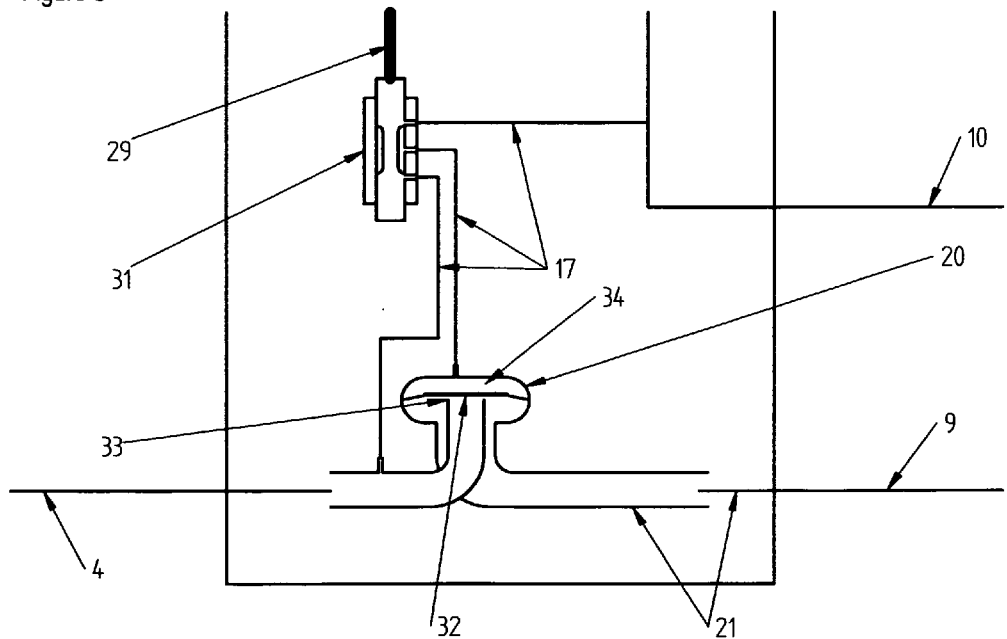

FIG. 8 shows an example of the flow balancing device with a pressure regulating mechanism that actuates a third valve upstream of the second flow control valve to regulate the pressure of the fluid flow supplying it along the second flow conduit. The third pressure control valve may in alternative embodiments be located elsewhere upstream of the second flow control valve, even preferably (as illustrated in FIG. 9), along a third conduit supplying fresh water to the heat exchanger. The conduits connected to compartments of the piston chambers may have openings located anywhere on the chamber wall, may branch into multiple openings or join with other conduits to share common openings.

FIG. 9 shows a flow balancing device example with a spool valve pressure regulating mechanism actuating a third valve hydraulically on a separate conduit between a third inlet and outlet, such as may be connected into the conduit supplying mains fresh water to the heat exchanger.

The figures illustrate schematically various features of various examples. Not all features illustrated are necessarily essential to the embodiments illustrated, and not all features of the represented embodiments may be necessarily there illustrated. For example, the examples described will generally all have a control feature for user/manual interface, and preferred examples will generally have electrical components for motorised actuation and regulation of the valves which are not illustrated or described in detail here, since such elements are known.

That is, the flow paths illustrated without particular features (eg. valve) may be circumstantial or contextual elements independent of device examples to which the illustration relates. The elements in the drawings do not signify that an example of the invention need be a single device or in a single location, not that all conduit sections or auxiliary features illustrated therein need be so embodied. The examples of the invention as a flow balancing device and/or pressure regulating mechanism may comprise multiple physical devices or components which may be installed in separate locations.

A basic embodiment of this invention consists of a control means linked to two flow control valves for simultaneous actuation. Any type of variable aperture flow regulating valve mechanism may be employed in this context, where the actuation of two such instances can be linked by a common mechanism operated by a single control input. The main structural component of the device (35) incorporates or is attached to the casings of both valves being contiguous with the devices fluid inlets, outlets and inter-connecting conduits and held in structurally fixed relative position or arrangement. The flow limiting aperture adjustment in each valve is effected by one or more moving parts which are mechanically linked with each other or to a common/shared mechanism for actuation. Such a mechanical linkage mechanism may employ levers, rods, cogs, cables, chains/belts, articulating joints, axles/shafts or hinges.

An example may consist of two ball valves which can be opened by rotation in either direction having their axes linked via an actuating rod which may be the double-ended shaft of an electric motor, such as a stepper motor, or which is mechanically linked to a user interface for manual adjustment with such a feature as a lever, dial or knob. Any other type of check valve or gate valve having variable apertures however, may also be employed to make a suitable example.

This example may be appropriately employed in multiple shower installations supplied with warm water at a preset utility outlet temperature from a central water heating unit (FIG. 4), wherein preferably:

The shower installations are identical or thermohydrolically equivalent (having similar thermal and fluid dynamic properties) each using a heat exchanger and similar flow balancing device;

There are no other warm water utility outlets connected to the hot water system that could significantly disturb the pressure head of water in the hot water system during use;

The pressure head in the hot water system does not exceed the pressure head of the cold water supply, but is less than or dependent upon and proportional to the cold water supply pressure head; and, The connecting pipes to the heating unit (6 and 5) have the same characteristics of resistance to flow.

Preferably, both for economy of manufacture and a more consistent optimal performance of the device, where the connecting pipes to the heating unit (6 and 5) have the similar characteristics of resistance to flow, the valve components of the flow balancing device may be identical, similar or equivalent hydrodynamically. Where this is not so the flow balancing device may more appropriately incorporate non-identical valves with marginally different hydrodynamic properties (i.e. flow resistances) which may also vary to different extents during the operation of the device and/or be connected to a flow resisting component/conduit so as to compensate for the disbalance.

The relative resistances applied by each valve at any state of operation correspond generally (i.e. at least approximately, relative to the outlet 7) to the pressure head changes along the fluid heating and preheating-heat exchanger conduits for which the flow balancing device is designed to operate with, so that a generally equivalent (or at least approximately equal) rate of flow through each valve is maintained according to the principle that a difference in pressure head along a conduit is proportional to the resistance to flow for a given rate of flow along a conduit. Thus the fluid pressure at the inlet to the first valve of the flow balancing device will always be less than the pressure at the outlet (and inlet) to the second valve during effective operation. The particular hydrodynamic conditions referred to here (i.e. appropriate plumbing connections, relative pressure heads and flow rates) are only required during effective operation of the shower or heat exchanger system and may not normally be evident as they are not necessary during times when the demonstration of optimal heat recovery performance through this apparatus is not required or intended.

The examples of the invention in some circumstances use hydrodynamically identical or similar first and second valves which apply an equivalent resistance to fluid flow through each valve respectively during effective operation, whereby the pressure head of fluid in the heater conduit (i.e. between the first valve inlet and the second valve outlet) will generally be half the pressure head at the second valve inlet (from the heat exchanger conduit).

In examples for shower installations having the facility to independently regulate the shower temperature, a third flow regulating valve may be integrated (shown in FIGS. 5 to 8) to control a flow of water bypassing the hot water system from the heat exchanger to a place for blending with the heated water prior to delivery via the shower head. In this arrangement the coupled hot water valves may be also linked to the bypass valve for inversely proportional conduit aperture control and flow regulation, so as to provide variable control of the outlet fluid temperature independently of the outlet fluid flow rate.

The equivalent flow arrangement of three two way valves may be achieved by alternative embodiments of the flow balancing device using two three way (flow dividing) valves linked by a unified control means (FIG. 6) whereby one of the branches of each valve is connected to the bypass conduit whilst the other branches are connected to the hot water replenishment and supply conduits respectively, or a single four way valve. These embodiments preferably include a flow resisting component (19) as shown in FIG. 8 or conduit section integrated within the bypass conduit so as to balance the flow resistance of the unheated water flow path with that of the heated water flowpath. Examples may include one or more one-way valves in the first, second and/or bypass fluid flow conduits to maintain appropriate direction of flow in their respective conduits.

Additional warm water utilities without heat exchangers may be also connected to the heating unit without loss of heat exchange efficiency if fresh water is replenished to the heating unit on behalf of these utilities by a default feed at a pressure head less than that fed by the heat exchangers. If it is substantially less then these utilities may draw extra fresh water through the active heat exchangers, which can only enhance heat recovery. A limitation however of this simple arrangement may arise as a result of high resistance to flow imposed by the heat exchanger on the fresh water passing through it, causing a substantial drop in the pressure head of prewarmed water supplying the heating unit during operation. If another shower device is concurrently active at a much lower flow rate or the replenishment feed of another utility with no heat exchanger is activated, a portion of the first device's hot water replenishment may follow a path of lower resistance via the replenishment feeds of these other utilities, thereby reducing the optimal efficiency of heat recovery.

Here a more elaborate example of the invention is suitable in which an additional component is integrated to control and adjust the pressure head delivering prewarmed water to the heating unit in correspondence with changes in the pressure head of the hot water unit, illustrated in FIG. 8. This example also requires a freshwater supply at a higher pressure head than that of the heated water supply, so that despite the pressure drop in the fresh water supply across the heat exchanger, the pressure head of the prewarmed water remains as a rule not less than two times greater than the pressure head of the hot water unit, relative to the pressure head of water near the shower head during operation. Exceptions to this rule occur where the conduit's resistance to the flow of the heated water supply (5) is substantially less/more than to the flow of the heated water replenishment (6), in which case the fresh water supply will need be more/less than two times greater.

For this purpose a pressure regulating mechanism (PRM) is also here disclosed consisting of two fluid chambers wherein the internal fluid space is divided by a freesliding piston head (18). These piston heads are in contact with the fluid on both sides/ends of the chamber such that their position or movement will depend on the relative fluid pressure in the two chamber compartments on each of their fluid facing ends, and are joined mechanically by a connecting linkage to allow reversible concerted movement of both pistons with respect to their containing chambers. As an alternative to the example of a piston head sliding within a prism/cylindrical shaped cavity, a membrane or diaphragm may be employed to divide a chamber into two variably proportioned compartments, which is likewise connected to a linkage mechanism. The preferred arrangement/embodiment of these chambers/pistons and connecting mechanical linkage is a co-axial alignment of cylindrical chambers and piston heads with an interconnecting shaft which FIG. 8 illustrates. Each chamber compartment (subchamber) normally has one or more openings acting as inlets or outlets (or both) to which a section of conduit is or may be appropriately attached. The position(s) of the piston heads and their mechanical linkage relative to the chamber fluid compartments (whose relative pressures they are determined by) being readily detectable, sensed or gauged and in association with a suitable valve controlling mechanism provides a means for appropriately actuating or controlling the state of a valve in the conduit supplying fresh water to the heat exchanger (4/9). Thus the pressure regulating mechanism may include a means whereby the position of the connecting linkage (corresponding to the relative fluid volumes and pressures of the chamber compartments in front of and behind each of the piston head end surfaces) determines the state of the flow-pressure control valve in the conduit supplying fluid to the heat exchanger. This mechanism may determine a static state of the control valve (i.e. a given resistance to flow, pressure difference or constriction in the fluid conduit aperture) or a dynamic state (i.e. a state of change in the valve's static state of aperture, flow resistance or induced fluid pressure difference: increase, decrease or stasis). This mechanism may be implemented by various means, which may be electronic/digital (with position sensors and actuators), mechanical or hydraulic.

The preferred means for controlling the heat exchanger fluid supply which is generally more economical to manufacture and cost-effective to operate than other means of the prior art valve uses a hydraulic mechanism as now described with reference to FIG. 9.

The fresh water flow-pressure control valve comprises a rim (33) within the conduit around which the fluid flows and a freely moveable surface (32) that may rest upon or be distanced from the said rim so as to close the flow passage or vary the aperture for fluid flow through the valve. This moveable surface may be a membrane or diaphragm as used in solenoid valves or a fluid-facing end of a piston head sliding within a prism cavity. This moveable surface (32) may have a formation that protrudes through the aperture near the rim (33), so as to vary more gradually the valve's fluid flow aperture with respect to the movement/displacement of the valve's moving surface (32). The prefered shape of such a formation with a circular rim is a concentrically aligned cone or frustrum. At the opposite end of the piston head's aperture closing face there is a reservoir of fluid (34), connected to a spool valve (31) actuated by the mechanical linkage (29) connected with the fluid chambers' compartment dividers (22, 25). This spool valve (31), connects the fluid reservoir (34) behind the freshwater flow control valve piston with either the freshwater supply upstream of the said valve (4) or fluid in a section of conduit downstream of the said valve (9 or 10), or at a position between them.

Each piston is free to move in its chamber which is closed at both ends except for the passageway of piston shafts and any connecting conduits or other features, and is sandwiched between a body of fluid on both sides/ends. Whilst this arrangement of dividing a chamber into two compartments is preferred for economy of space and to simplify the linkage mechanism, the equivalent functionality can also be achieved with examples wherein the fluid compartments are confined by separate chambers and separate piston heads linked together by a mechanical linkage mechanism to move in concert.

The pressure regulating mechanism complements the flow balancing device in function and operation, so that either device/mechanism may be embodied with the other as an auxilliary feature/component or into an integrated device/mechanism wherein each pressure regulating mechanism fluid compartment is connected to one or other of the flow balancing device water conduits (5, 6, 7, 10) and FIG. 8 illustrates this. The flow balancing device and pressure regulating mechanism may also be embodied together without the bypass flow path, and the pressure control valve may be elsewhere located preferable upstream of the heat exchanger (between 4 and 9, as FIG. 9 illustrates) if the heat exchanger has a limited pressure tolerance rating.

Examples of the pressure regulating mechanism with piston-type chamber dividers as opposed to a diaphragm/membrane type (displaceable separators) are better disposed for the embodiment of certain auxiliary features described as follows. A piston head or piston shaft may act as a spool valve within its chamber or sheath to restrict or reduce the fluid flow through a chamber compartment's connecting conduit, or any other conduit. Conduits may be connected to the chamber compartments via a plurality of openings which may be independently and/or successively closed by the transposed piston head (or shaft) for variable flow control. A spool valve actuated by the piston linkage mechanism may alternatively regulate the fluid flow in other sections of conduit, such as the bypass conduit (11). This feature provides the benefit of a rapid means to compensate for sudden or major disturbances in the hot or cold fluid supply pressure or temperature, for more effective thermostatic control/stability. Similarly, the pistons or their linkage mechanism may be so featured as to open a flow path when displaced to extreme positions, for example to allow the relief of high pressure in the heat exchanger thermal transfer conduit (9 and 10) that can occur if the linked valves are closed abruptly before the fresh water supply pressure regulating valve closes.

One or more springs may be located coaxially to the pistons, shafts or proximally to the mechanical linkage in such a way as to resist excessive movement or displacement of the piston heads from a midway position. Each chamber compartment of the pressure regulating mechanism is connected to one or other of the devices flow-regulating valves so that each body of fluid on each side of each piston is connected or hydraulically connectable to one or other side of one or other of the flow control valves, in such a way that the pressure head of the heating unit conduits (5 and 6) combine to act against the pressure head of the preheated water supply (10) and any head of pressure at the shower head (7).

The piston heads may have cuttings around their perimeter connected by a passageway to one or other face of the piston, to allow for alignment of the piston head circumference over a conduit opening on the cylinder surface so as to able to occlude it partially or completely at an appropriate position of the interlinking shaft. The piston heads may be connected to linear displacement shafts passing through water tight seals in either one or both of the enclosing cylinder ends. The pressure regulating mechanism may incorporate a mechanism or feature to dampen the free movement of the piston heads as a means to prevent enduring states of oscillation and vibration in the pressure regulating mechanism, where this means is not sufficiently provided for by frictional forces of the pistons and cavity walls or fluid. The preferred embodiment of a damping mechanism comprises a cavity in the internal wall of a chamber compartment for a piston shaft end (or similarly connected member) to slide within into/from which fluid may enter/exit according to its displacement by the piston shaft/member via a flow restrictive (narrow) conduit or groove.

A conduit connected to a pressure regulating mechanism fluid compartment may have an opening in a piston head or connecting shaft and may pass internally within the shaft or piston head.

The flow balancing device may feature a bypass conduit (11) which connects the preheated water supply from the heat exchanger (10) to the shower head delivery pipe (7). The bypass conduit may be appropriately connected to the conduits (10 and 7), flow control valves (3 and 14), piston chamber compartments or a combination/mixture of these. The bypass conduit may pass through a flow control valve (12) and/or a flow resisting aperture or component (19) which serves to stabilise the pressure/flow supplying the outlet (7) over a range of temperatures (or proportions of blended heated water) by balancing the pressure difference/drop across the flow path through the heating system (5 to 6). The preheated water bypass valve (12) may be mechanically linked to the heated water valves (3 and 14) for inversely proportional actuation and controlled by a manual input means, such as a lever.

A preferred example uses a motorised means to control these valves independently via an integrated electronic control mechanism, so as to compensate automatically for gradual changes in the temperature of the heat exchanger return flow (10) supplying the shower head (7) and hot water system (6). This may be an electronic control processor taking input from temperature sensors (30) and a user-interface temperature control setting, connected to drivers for controlling the angular position of stepper motors which are attached to and coaxially aligned with (or linked to via a gearing/lever mechanism) flow control valves. Electronic mixer valves are well established in the prior art, and whilst their control mechanism responds to transient changes in the temperature of the hot water supply, the control mechanism used by examples of this invention respond also to transient changes in the cold or preheated water supply to maintain a stabilised water output temperature to the shower head (7). The control input for this electronic control mechanism may be via digital input (from a keypad or touch screen) or via knobs, levers, dials, a remote weight/pressure sensitive device, or another actuating mechanism.

Examples may feature pressure sensors or contact breakers/switches activated by displacement of the central shaft/linkage mechanism connected for signal input to the controlling unit/processor. Temperature sensors (30) may be placed at any position within or local to a conduit or the piston chamber compartments. Temperature sensors coupled to internal linings of the piston cylinders or connecting conduits which are made of a thin thermally conductive material of low thermal capacity are preferable for monitoring the temperatures of mixed or blended fluids.

The hydraulically regulated pressure adjusting component incorporated with the coupled flow regulating valves functions as is now described.

The net forces of the combined pressure heads in the various conduits acting on the pistons determines the position of the connecting shaft (29). When the shaft is in a neutral or midway position, the springs are detensioned and the pressure differential/drop pushing water towards the heating unit (along 6) is equal to the pressure differential/drop pushing water from the heating unit (along 5) into the shower head delivery pipe, so that the water flows through the heat exchanger will be balanced.

If the pressure head at the heating unit drops, for example as a result of opening a hot water tap somewhere else, the pistons and interconnecting-shaft will move so as to allow fluid from the fresh water mains conduit (4) to flow into the control valve reservoir (34) causing the valve to gradually close and reduce the pressure of the preheated water supply (10) until the pressure differentials to and from the heating unit are again balanced, and the piston-shaft returns back to its neutral position.

This system of regulation of fresh water feed pressure in correspondence to the hot water supply pressure not only maintains balanced flow rates through the heat exchanger but has the thermostatic benefit of buffering pressure fluctuations in the hot water system (or indeed the cold water supply).

If during this compensation process the fresh water supply valve (20) becomes completely closed, any pressure head in the hot water supply/system will push the pistons to a position at one end of the cylinders where the presence of the shower head outlet aperture, or any other conduit aperture may be occluded, thereby providing a mechanism for effectively shutting off the shower head supply/flow.

If the relative pressure head at the heating unit (or hot water feed/replenishment conduits) increases, the pistons and central shaft will move so as to allow fluid from the reservoir to flow into the preheated water supply conduit or chamber causing the pressure control valve (20) to open and thereby increase the flow to (and pressure head at) the preheated water supply chamber (26) until the pressure difference pushing fluid towards the heating unit (along 6) becomes again equal to the pressure difference pushing hot water into the shower head delivery conduit (along 5) and the piston again returns to its neutral position.

If during this compensation process the fresh water supply valve becomes maximally open or the compensation process is insufficiently effective or fast to protect against scalding or discomfort, with the shaft displacing to a more extreme position, the hot water supply feeding the shower head can be more immediately restricted or resisted by the following mechanisms:

Whereby a displaced piston occludes an aperture of the heated water supply conduit (5);

Whereby a displaced piston occludes an aperture in the first valve conduit which delivers the hot water supply (5) to the shower head delivery conduit (7);

Whereby the mid-shaft displacement effects a change in the valve state, via a mechanical, electrical/electronic or hybrid linkage, so as to reduce the proportion of hot water feeding into the shower head delivery conduit.

The invention claimed is:
1. A fluid flow control system comprising:
a heating device for heating a fluid;
a first flow path for providing the heated fluid from the heating device to a use region;

a heat exchanger having a supply path adapted to receive fluid from a fluid supply and an outlet path adapted to receive fluid from the use region, whereby the fluid in the supply path is pre-heated by the fluid in the outlet path;

a second flow path for providing the pre-heated fluid from the supply path of the heat exchanger to the heating device;

a first flow modulating device for controlling a flow of fluid along the first flow path and therefore along the outlet path; and, a second flow modulating device for controlling a flow of pre-heated fluid along the supply path;

wherein the system further comprises a flow control device adapted to control each of the first and second flow modulating devices such that, during use, the fluid flow rates or changes to/in said flow rates in the fluid supply path and outlet path of the heat exchanger correlate substantially in proportion;

a bypass flow path for providing per-heated fluid from the supply bath to the use region, the bypass flow path being connected between the second flow path upstream of the heating device and the first flow path downstream of the heating device; and, a bypass flow modulating device for controlling the flow of fluid in the bypass path;

wherein the flow control device is further adapted to control the bypass flow modulating device such that the flow rate in the bypass path is a function of the flow rate in at least one of the first flow path and the second flow path;

wherein each of the first, second and bypass flow modulating devices are capable of providing a variable degree of fluid flow between a closed position in which fluid flow is prevented and a fully open position;

wherein the control device is operative to cause the actuation of the first and second flow modulating devices proportionally to that of the bypass flow modulating device.

2. A fluid flow control system according to claim 1, wherein the flow control device comprises a common actuating device for controlling the said modulating devices.

3. A fluid flow control system according to claim 1, wherein the flow control device comprises one or more of a mechanical, hydraulic or electrical coupling between the said modulating devices.

4. A fluid flow control system according to claim 1, wherein any of the flow modulating devices are electrically actuated, wherein the system further comprises one or more temperature sensors and wherein the system further comprises a user interface for controlling the modulating devices using the information from the said temperature sensors.

5. A fluid flow control system according to claim 1, wherein the use region comprises a shower facility.

6. A fluid flow control system comprising:
a heating device for heating a fluid;
a first flow path for providing the heated fluid from the heating device to a use region;
a heat exchanger having a supply path adapted to receive fluid from a fluid supply and an outlet path adapted to receive fluid from the use region, whereby the fluid in the supply path is pre-heated by the fluid in the outlet path;
a second flow path for providing the pre-heated fluid from the supply path of the heat exchanger to the heating device;
a first flow modulating device for controlling a flow of fluid along the first flow path and therefore along the outlet path; and,
a second flow modulating device for controlling a flow of pre-heated fluid along the supply path;
wherein the system further comprises a flow control device adapted to control each of the first and second flow modulating devices such that, during use, the fluid flow rates or changes to/in said flow rates in the fluid supply path and outlet path of the heat exchanger correlate substantially in proportion;
a bypass flow path for providing pre-heated fluid from the supply path to the use region, the bypass flow path being connected between the second flow path upstream of the heating device and the first flow path downstream of the heating device; and,
a bypass flow modulating device for controlling the flow of fluid in the bypass path;
wherein the flow control device is further adapted to control the bypass flow modulating device such that the flow rate in the bypass path is a function of the flow rate in at least one of the first flow path and the second flow path;
wherein each of the first, second and bypass flow modulating devices are capable of providing a variable degree of fluid flow between a closed position in which fluid flow is prevented and a fully open position;
wherein the control device is operative to cause the actuation of the first and second flow modulating devices inversely proportionally to that of the bypass flow modulating device so as to allow control of the temperature of the fluid in the use region substantially independently of the fluid flow rate.

7. A fluid flow control system comprising:
a heating device for heating a fluid;
a first flow path for providing the heated fluid from the heating device to a use region;
a heat exchanger having a supply path adapted to receive fluid from a fluid supply and an outlet path adapted to receive fluid from the use region, whereby the fluid in the supply path is pre-heated by the fluid in the outlet path;
a second flow path for providing the pre-heated fluid from the supply path of the heat exchanger to the heating device;
a first flow modulating device for controlling a flow of fluid along the first flow path and therefore along the outlet path; and,
a second flow modulating device for controlling a flow of pre-heated fluid along the supply path;
wherein the system further comprises a flow control device adapted to control each of the first and second flow modulating devices such that, during use, the fluid flow rates or changes to/in said flow rates in the fluid supply path and outlet path of the heat exchanger correlate substantially in proportion;
a fluid pressure regulating system, the fluid pressure regulating system comprising:
a fluid pressure modulating device located in either the second flow path or the supply path;
pressure sensitive surface areas in pressure communication with the upstream and downstream sides of the first and second flow modulating devices which are coupled so as to actuate a common mechanism for controlling the fluid pressure modulating device; and
a pressure control system adapted in use to control the fluid pressure modulating device, in accordance with the displacement of the pressure sensitive surfaces or fluid pressure thereat, so as to control the flow of fluid in the second flow path with respect to that in the first flow path.

8. A fluid pressure regulating system comprising:
- a fluid pressure modulating device connectable to a fluid supply;
- a first flow modulating device and a second flow modulating device, each having a controllable resistance to fluid flow;
- a first upstream subchamber and a first downstream subchamber having a common first displaceable separator, the displacement of the first displaceable separator determining the relative internal volumes of each of the first subchambers, wherein an upstream side of the first flow modulating device is arranged in pressure communication with the first upstream subchamber and a downstream side of the first flow modulating device is arranged in pressure communication with the first downstream subchamber;
- a second upstream subchamber and a second downstream subchamber having a common second displaceable separator, the displacement of the second displaceable separator determining the relative internal volumes of each of the second subchambers, wherein an upstream side of the second flow modulating device is arranged in pressure communication with the second upstream subchamber and a downstream side of the second flow modulating device is arranged in pressure communication with the second downstream subchamber, the upstream side of the second flow modulating device being arranged for receiving fluid from the fluid pressure modulating device and wherein the first and second separators are coupled mechanically; and
- a pressure control system adapted in use to control the fluid pressure modulating device, in accordance with the position of the first and second separators with respect to the subchambers.

9. A fluid pressure regulating system according to claim 8, wherein each of the subchambers is prismatic or cylindrical in geometry and wherein the displaceable separators are piston heads slideable in a fluid-tight manner within their respective subchambers.

10. A fluid pressure regulating system according to claim 8, wherein one or more openings allowing fluid communication with one or more of the subchambers are provided so as to be blocked when the corresponding piston head is in a predetermined position.

11. A fluid pressure regulating system according to claim 8, wherein the pressure control system comprises a spool valve coupled to the separators and arranged to operate the fluid pressure modulating device hydraulically.

12. A fluid pressure regulating system according to claim 8, further comprising one or more resilient members positioned so as to bias the displaceable separators to a position which is intermediate between each end of a possible range of displacement.

13. A fluid pressure regulating system according to claim 8, further comprising a displacement damper coupled to one or more of the separators so as to prevent or dampen oscillations in the displacement of the separators.

14. A fluid pressure regulating system according to claim 8, wherein the displacement of the separators is arranged so as to be along a common direction.

15. A fluid pressure regulating system according to claim 8, wherein, when the separators are provided as pistons, one or more conduits are provided within the pistons so as to allow a flow of fluid therethrough.

16. A fluid pressure regulating system according to claim 8, wherein the position of the first and second separators is a function of the relative pressures within the first and second upstream and downstream subchambers when in use.

17. A fluid pressure regulating system according to claim 8, wherein the mechanical coupling of the first and second separators is such that each of the separators experiences a concerted displacement when in use.

18. A fluid pressure regulating system according to claim 8, wherein the first and second flow modulating devices are mechanically, hydraulically or electrically actuated.

19. A fluid flow regulating system as claimed in claim 8, wherein the first and second flow modulating devices are incorporated within a unit having at least two inlets and at least two outlets for the passage of fluid flow there through and for connection with associated conduits.

* * * * *